J. B. HILL.
CLOTHES LINE SUPPORT.
APPLICATION FILED MAR. 21, 1918.
1,301,263.
Patented Apr. 22, 1919.
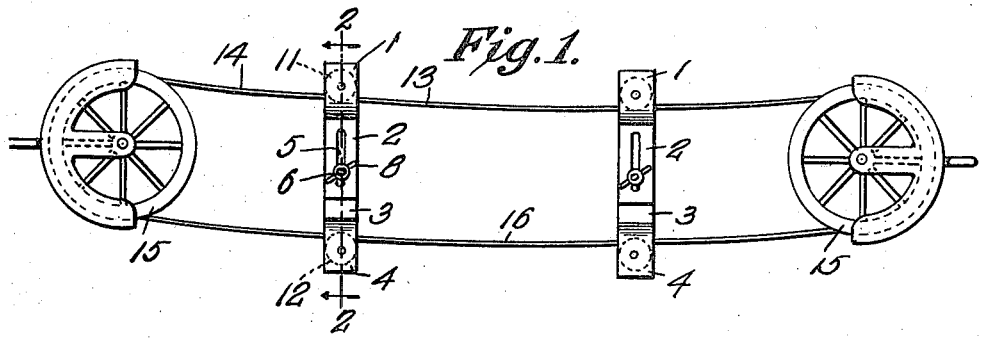
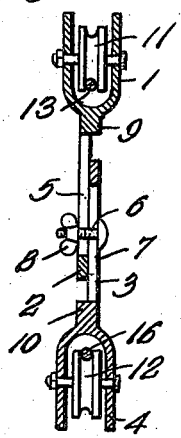
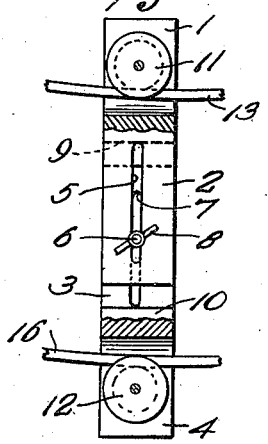
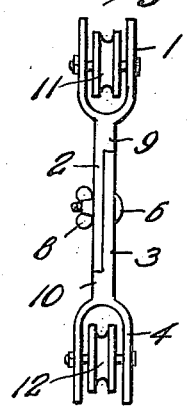
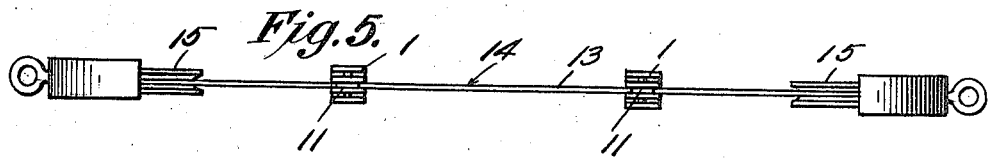
WITNESSES
INVENTOR
Joseph B. Hill,
BY
ATTORNEY

UNITED STATES PATENT OFFICE.

JOSEPH B. HILL, OF EVANS MILLS, NEW YORK.

CLOTHES-LINE SUPPORT.

1,301,263.  Specification of Letters Patent.  Patented Apr. 22, 1919.

Application filed March 21, 1918. Serial No. 223,815.

*To all whom it may concern:*

Be it known that I, JOSEPH B. HILL, a citizen of the United States, residing at Evans Mills, in the county of Jefferson and State of New York, have invented certain new and useful Improvements in Clothes-Line Supports, of which the following is a specification.

This invention relates to supporting means, and more particularly to supports especially adapted for use in connection with clothes lines for preventing excessive sagging of the lower run of the line.

One of the main objects of the invention is to provide a device of the character stated of simple construction and operation which may be readily used in conjunction with a clothes line of ordinary construction. A further object is to provide a supporting device having rollers which engage over and under the upper and lower run, respectively, of an endless line so as to prevent excessive sagging of the lower run thereof. A further object is to provide a device of the character stated which may be readily adjusted to accommodate lines in which the runs of the line are positioned different distances apart. Further objects will appear from the detailed description.

In the drawing:—

Figure 1 is a side view of a supporting device constructed in accordance with my invention as applied.

Fig. 2 is a section taken substantially on line 2—2 of Fig. 1.

Fig. 3 is an enlarged side view of the supporting device with the pulley supporting frames broken away.

Fig. 4 is an edge view of one of the supporting devices.

Fig. 5 is a top plan view of the device as applied.

This device comprises, broadly stated, two oppositely directed members each provided at its outer end with a supporting head or frame in which is mounted a pulley for engagement with a clothes line. The upper one of these members is provided, at its upper end, with a substantially U-head or fork 1 having an integral downwardly directed shank 2, which is slidably connected to the shank 3 of the lower member, the latter provided at its lower end with a U-frame or fork 4, directed oppositely to fork 1. Shank 2 is provided with a central longitudinal slot 5 which receives a securing screw 6 which is inserted through a similar slot 7 in shank 3. A wing nut 8 is threaded on this screw and bears against the outer face of shank 2, serving to frictionally secure the two shanks 2 and 3 in relative adjustment. Shank 2 is thickened at its outer end adjacent fork 1 to provide an outwardly projecting shoulder 9 which is engageable by the upper end of shank 3, a similar shoulder 10 being provided at the lower end of shank 3 for engagement by the lower end of shank 2. By this construction, the two forks 1 and 4 may be adjusted toward and away from each other, the shoulders 9 and 10 serving to positively limit the adjustment of these members toward each other and to effectually prevent looseness or play between the shanks when in their innermost position.

A groove pulley 11 is rotatably mounted in the fork 1, a similar pulley 12 being mounted in the fork 4. In use, the upper run 13 of the clothes line 14, which is passed about the supporting pulleys 15 secured to any suitable supports, is inserted through the fork 1 beneath the pulley 11, the lower run 16 being inserted between pulley 12 and the head or fork 4. By this means, the upper run 13 serves to support pulley 11 and the supporting frame, the lower run 16 being supported by the pulley 12. This results in an equal strain being placed upon each of the runs of the line, while sagging of the lower run 16 is effectually prevented, as in Fig. 1. In practice, as many of these devices as may be desired will be used, the number employed depending largely upon the length of the line, the type of line used, the number of clothes placed upon the line, etc. By providing these devices at equal distances along the line, the strain placed upon the line will be distributed equally upon the upper and lower run thereof, and all looseness or sagging of the lower runs such as would permit the clothes supported thereby to drag in the dirt, is effectually prevented. This device may be readily formed from sheet material or other suitable light material, and may be readily applied to any clothes line of ordinary construction. By having the two sections of the supporting device relatively adjustable, the pulleys 11 and 12 may be moved toward and away from each other so as to vary the distance between the runs of the line to suit circumstances, or to accommodate supporting pulleys of different diameters. This renders it possible to quickly and easily adjust this device for use in connection with any particular line.

As will be noted, the groove pulleys which receive the upper and the lower runs of the line, are detachably secured in the U-heads or forks by bolt and nut means so as to be readily removed therefrom. By this means, the pulleys can be easily removed so as to permit placing of the same under and over the lower and upper runs of the line, respectively, thus greatly facilitating applying the device to a clothes line. Of course, instead of using bolt and nut means for holding the pulleys, any other suitable or equivalent securing means which will permit ready detachment of the pulleys from the U-forks or heads may be employed.

It will be evident that there may be slight changes made in the construction and arrangement of the details of my invention without departing from the field and scope of the same, and I intend to include all such variations, as fall within the scope of the appended claim, in this application in which a preferred form only of my invention is disclosed.

What I claim is:—

The combination with an endless clothesline having upper and lower runs; of a support for the mid-length of said line comprising a pair of forks, each having its shank slotted longitudinally and overlapping the shank of the other fork and each provided with a shoulder adapted to abut the end of the other shank when the members are adjusted toward each other, a screw through the slots and having a wing-nut on one end, and grooved pulleys journaled in their respective forks, the upper pulley traveling upon the upper run of the line and the lower pulley below the lower run thereof, as described.

In testimony whereof I affix my signature in presence of two witnesses.

JOSEPH B. HILL.

Witnesses:
  OLIVE A. NELLIS,
  EARL G. STEINHILBER.